(12) United States Patent
Ho et al.

(10) Patent No.: US 12,393,235 B2
(45) Date of Patent: Aug. 19, 2025

(54) HINGES FOR ELECTRONIC DEVICES

(71) Applicant: Intel Corporation, Santa Clara, CA (US)

(72) Inventors: Jeffrey Ho, New Taipei (TW); Shawn Mceuen, Portland, OR (US); Min Suet Lim, Pulau Pinang (MY); Yew San Lim, Pulau Pinang (MY); Bruce Cheng, Taipei (TW)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 18/185,505

(22) Filed: Mar. 17, 2023

(65) Prior Publication Data

US 2024/0310881 A1   Sep. 19, 2024

(51) Int. Cl.
*G06F 1/16* (2006.01)
*E05D 5/14* (2006.01)
*F16C 11/04* (2006.01)
*E05D 3/02* (2006.01)

(52) U.S. Cl.
CPC ............ *G06F 1/1681* (2013.01); *F16C 11/04* (2013.01); *E05D 3/02* (2013.01); *E05D 5/14* (2013.01); *E05Y 2999/00* (2024.05)

(58) Field of Classification Search
CPC ....... G06F 1/1681; G06F 1/1616; F16C 11/04
USPC .......................................................... 16/221
See application file for complete search history.

(56) References Cited

U.S. PATENT DOCUMENTS

| 5,934,945 | A * | 8/1999 | Petersen | H01R 13/426 439/744 |
|---|---|---|---|---|
| 6,213,666 | B1 * | 4/2001 | Lang | B29C 33/444 401/208 |
| 11,697,956 | B1 * | 7/2023 | Cheng | E05D 5/02 16/337 |
| 2006/0064850 | A1 * | 3/2006 | Sato | G06F 1/1681 16/330 |
| 2007/0033769 | A1 * | 2/2007 | Lu | G06F 1/1681 16/221 |
| 2007/0050941 | A1 | 3/2007 | Lu et al. | |
| 2009/0237871 | A1 * | 9/2009 | Shi | H04M 1/0216 361/679.01 |
| 2010/0154169 | A1 * | 6/2010 | Chen | G06F 1/1681 16/337 |
| 2013/0078838 | A1 | 3/2013 | Lin et al. | |
| 2019/0346890 | A1 * | 11/2019 | Kim | E05D 11/00 |
| 2022/0061174 | A1 | 2/2022 | Xie et al. | |

(Continued)

OTHER PUBLICATIONS

European Patent Office, "European Search Report," issued in connection with European Patent Application No. 23215204, issued on May 6, 2024, 11 pages.

*Primary Examiner* — Allen L Parker
*Assistant Examiner* — Peter Krim
(74) *Attorney, Agent, or Firm* — Hanley, Flight & Zimmerman, LLC (57) ABSTRACT

Hinges for electronic devices are disclosed herein. An example hinge includes a bracket capable of being coupled to a first portion of the electrical device. The bracket has a barrel defining a first opening. The hinge also includes a shaft in the first opening. The shaft is rotatable in the first opening. The hinge further includes a sleeve capable of being inserted into a bore in a second portion of the electronic device. The sleeve defines a second opening to receive a portion of the shaft.

17 Claims, 10 Drawing Sheets

(56) References Cited

U.S. PATENT DOCUMENTS

2023/0384822 A1\* 11/2023 Lee ...................... G06F 1/1652
2023/0403347 A1\* 12/2023 Liu ...................... H04M 1/022

\* cited by examiner

HINGES FOR ELECTRONIC DEVICES

FIELD OF THE DISCLOSURE

This disclosure relates generally to hinges and, more particularly, to hinges for electronic devices.

BACKGROUND

Some electronic devices include two body portions that are rotatably coupled by one or more hinges. For example, laptop computers typically include a base and a lid that are coupled by two hinges to enable the lid to rotate relative to the base.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" or "engaged" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Some electronic devices have two body portions or sections that are rotatably or pivotably connected by one or more hinges to enable the body portions to be moved (e.g., transitioned, converted, folded) between two or more positions. For example, some computers, such as laptop computers, include a base (which includes a keyboard and houses the electronic components) and a lid (which includes a display such as a touchscreen) that is rotatably coupled to the base by two hinges. The hinges enable the lid to be rotated between a closed position, in which the lid is parallel to and disposed along the base, and an open position, in which the lid is angled relative to the base.

Some known hinges for laptop computers include two brackets rotatably coupled by a shaft. One of the brackets is coupled to the base and one of the brackets is coupled to the lid. Press-in unibody hinges are gaining popularity on laptop computers with narrow display bezels because they do not require a bracket to be mounted on the lid. Instead, the hinge shaft is press fit directly into a hinge cap on the lid. This enables the display bezel to remain relatively narrow and thin. However, to ensure the hinge can handle the resulting stresses/loads, this requires a relatively long interface between the hinge shaft and the hinge cap. As such, known hinge caps are relatively long. As a result, the hinge caps tend to block at least a portion of the fan outlet(s) and/or ventilation hole(s) on the rear side of the base of the laptop computer, which reduces the cooling capability of the laptop computer.

Further, with known press-in hinges, the hinge shaft is undetachable from the hinge cap after insertion. The lid material is limited to softer materials (e.g., aluminum) to ensure the hinge cap is soft enough for insertion of the hinge shaft. This often deforms the hinge cap, such that the hinge cannot be repaired or replaced without a complete replacement of the lid.

Disclosed herein are example hinges that can be used on laptop computers and other electronic devices, such as tablets, phones, etc. The example hinges disclosed herein include a sleeve that is inserted into the bore in the hinge cap. The hinge shaft is inserted into an opening in the sleeve. As such, the sleeve forms an interface between the hinge shaft and the hinge cap. The sleeve has a guiding design to ease the hinge shaft into the sleeve (and, thus, the hinge cap) and help keep the hinge centered at the desired design angle. The use of the sleeve reduces structural yield stress, which enables the hinge cap to be shortened or reduced in length. Shorter hinge caps allow more room for the fan outlet(s) and/or ventilation hole(s) on the rear side of the base. As such, the example hinges disclosed herein improve thermal performance of the system. The reduced hinge cap length also provides more flexibility for the interior design/layout of the electronic components in the base.

Further, the example sleeve is detachable or removable from the hinge cap without damaging the hinge. As such, the hinge can be easily repair and/or replaced without having to replace the entire lid. This significantly reduces repair/replacement costs. Further, because the sleeve does not deform the hinge cap like in known hinges, the lid can be constructed of various types of material, and not just limited to softer material like aluminum. For example, the lid and the hinge cap can be constructed of harder materials such as stainless steel and/or magnesium. This also enables recycling of like-for-like materials, instead of mixed materials. For example, the hinge and the lid can be constructed of the same type of recyclable material.

While the example hinges disclosed are described in connection with laptop computers, it is understood the example hinges can also be used on any other electronic device that uses a hinge. For example, the hinges disclosed herein can be used on tablets (e.g., foldable tablets), phones, and/or foldable display screens.

Figure 1:
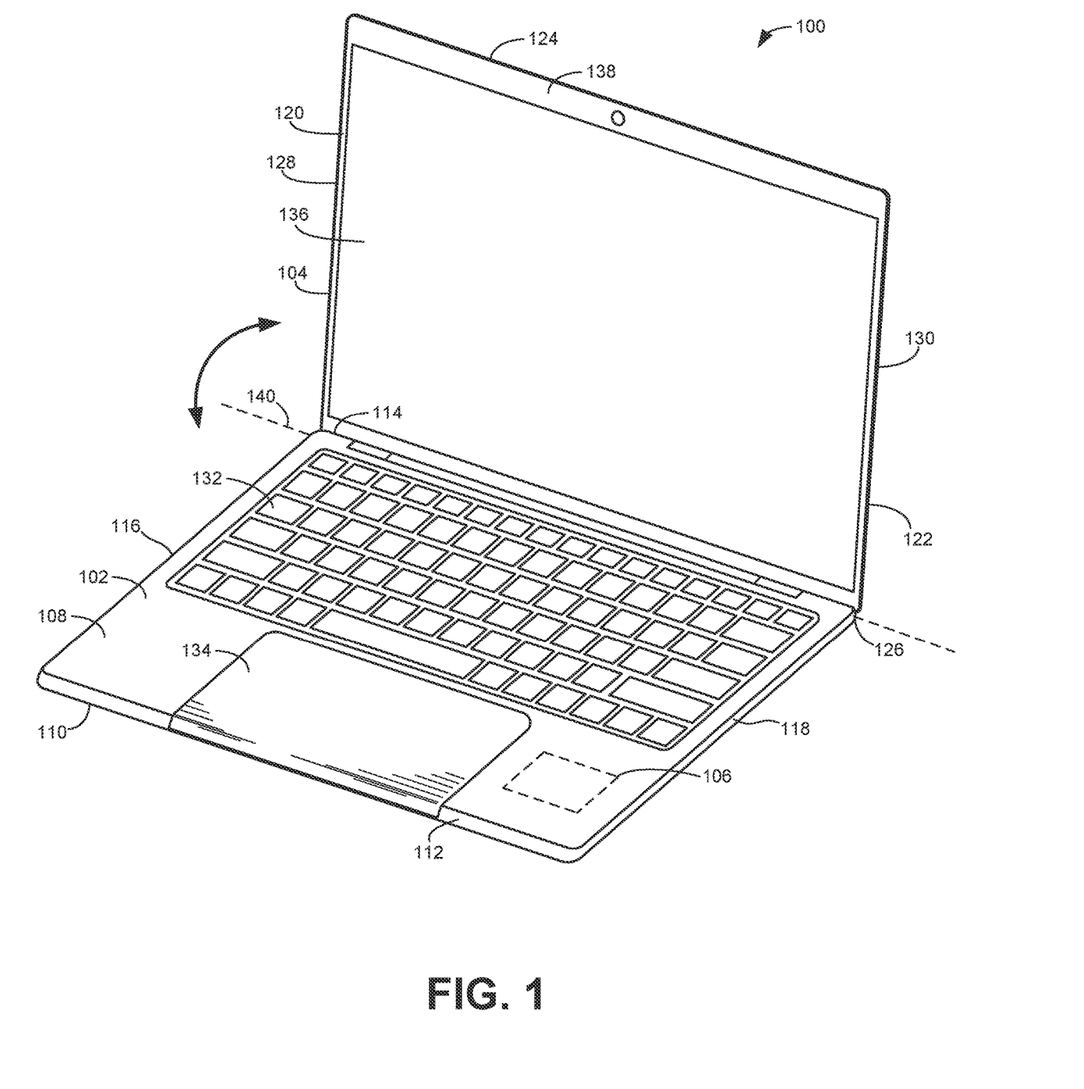
FIG. 1 is a perspective view of an example laptop computer having an example base and an example lid rotatably coupled to the example base.

FIG. 1 is a perspective view of an example electronic device 100 in which example hinges disclosed herein can be implemented. In this examples, the electronic device 100 is implemented as a computer, namely, a laptop computer, referred to herein as the laptop computer 100. However, the example hinges disclosed herein can be implemented in connection with other types of electronic devices.

In the illustrated example, the laptop computer 100 includes a first portion 102 and a second portion 104 that are moveably coupled (e.g., hingedly coupled). In this example, the first portion 102 is a base, referred to herein as the base 102, and the second portion 104 is a lid, referred to herein as the lid 104. The lid 104 can also be referred to as a top or cover. The base 102 and the lid 104 may together form a clamshell housing. The base 102 and/or the lid 104 may be constructed of aluminum, plastic, and/or any other material or combination of materials (e.g., stainless steel). The base 102 contains (e.g., houses) one or more electrical components 106 of the laptop computer 100. The electrical components 106 may include, for example, processor circuitry (e.g., a central processing unit (CPU), a graphics processing unit (GPU), processor core(s), etc.), one or more storage devices (e.g., solid state memory), one or more batteries, one or more cooling devices (e.g., fans), and/or other hardware and/or circuitry.

As shown in FIG. 1, the base 102 has a first side 108, referred to herein as a top side 108, and a second side 110, referred to herein as a bottom side 110, opposite the top side 108. The base 102 also has a first edge 112, referred to herein as a front edge 112, a second edge 114, referred to herein as a rear edge 114, opposite the front edge 112, a third edge 116, referred to as a left edge 116, and a fourth edge 118, referred to as right edge 118, opposite the left edge 116. The lid 104 has a first side 120, referred to herein as a front side 120, and a second side 122, referred to herein as a back side 122, opposite the front side 120. The lid 104 also has a first edge 124, referred to herein as a top edge 124, a second edge 126, referred to herein as a bottom edge 126, opposite the top edge 124, a third edge 128, referred to as a left edge 128, and a fourth edge 130, referred to as a right edge 130, opposite the left edge 128.

In the illustrated example, the laptop computer 100 includes a keyboard 132 and a touch pad 134 carried by the base 102 and a display 136 (e.g., a screen) carried by the lid 104. The display 136 is disposed at (and may form part of) the front side 120 of the lid 104. The display 136 is to present images in response to electrical signals from one or more of the electrical components 106. The display 136 may be located in a recess formed in the lid 104 and may be completely or partially surrounded by a bezel 138. The bezel 138 may or may not be flush with the display 136. In some examples, the base 102 can also include one or more displays.

In the illustrated example of FIG. 1, the base 102 and the lid 104 are rotatably or pivotably coupled along their rear and bottom edges 114, 126. The lid 104 may be rotated between an open position, as shown in FIG. 1, in which the lid 104 is angled relative to the base 102, and a closed position, in which the front side 120 of the lid 104 is adjacent and/or engaged with the top side 108 of the base 102. The base 102 and the lid 104 are pivotably coupled by one or more hinges, examples of which are disclosed in further detail herein. The base 102 and the lid 104 are pivotably coupled along a hingeline or axis 140 defined by the hinge(s). In some examples, the hinge(s) create sufficient friction to hold the lid 104 (and, thus, the display 136) at any desired angle relative to the base 102.

Figure 2:
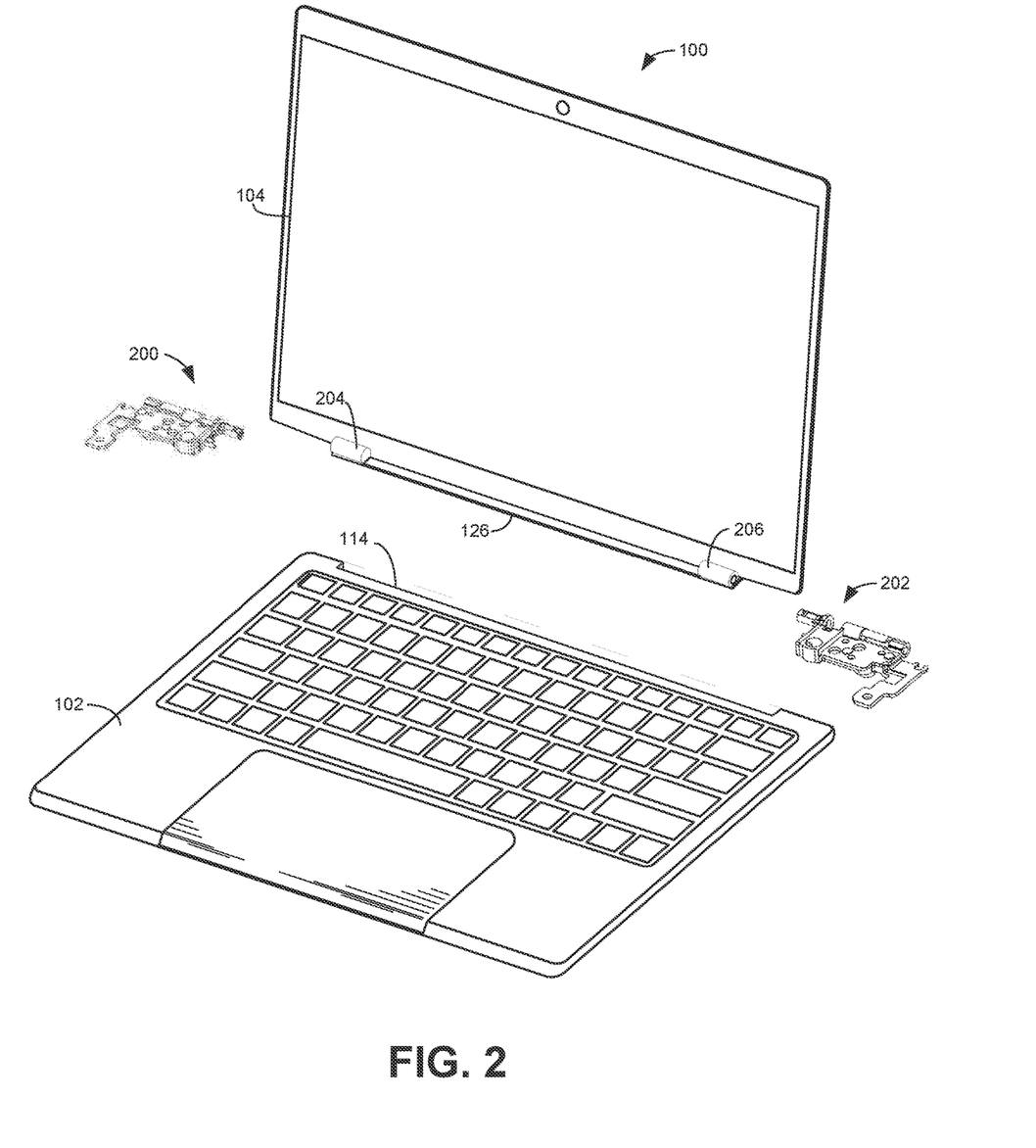
FIG. 2 is a partially exploded view of the example laptop computer of FIG. 1 showing example hinges used to rotatably couple the example base and the example lid.

FIG. 2 is a partially exploded view of the laptop computer 100. The lid 104 is shown as disconnected from the base 102. In the illustrated example of FIG. 2, the laptop computer 100 includes a first hinge 200 and a second hinge 202. The first and second hinges 200, 202 rotatably couple the base 102 and the lid 104. This enables the lid 104 to rotate between the open and closed positions relative to the base 102.

In this example, the first and second hinges 200, 202 couple the rear edge 114 of the base 102 and the bottom edge 126 of the lid 104. In the illustrated example, the lid 104 has a first hinge cap 204 and a second hinge cap 206 along the bottom edge 126 of the lid 104. The first and second hinge caps 204, 206 may also be referred to as sockets. The first and second hinge caps 204, 206 may be formed integrally (e.g., as a monolithic structure) with one or more portions of the lid 104. For example, the first and second hinge caps 204, 206 can be formed integrally with a panel or cover that forms the back side 122 (FIG. 1) of the lid 104. The first and second hinge caps 204, 206 define bores (e.g., openings, channels, tunnels) to receive a portion of the first and second hinges 200, 202, respectively. The first hinge 200 pivotably couples the first hinge cap 204 and the base 102, and the second hinge 202 pivotably couples the second hinge cap 206 and the base 102. Therefore, the first and second hinges 200, 202 pivotably or rotatably couple the base 102 and the lid 104.

The first and second hinges 200, 202 are substantially the same, expect they are oriented in the opposite or reverse direction. To avoid redundancy, only the first hinge 200 is disclosed in further detail herein. However, it is understood that any of the example aspects disclosed in connection with the first hinge 200 can likewise apply to the second hinge 202. Further, it is understood that in other examples, the laptop computer 100 may include only one hinge or more than two hinges.

Figure 3:
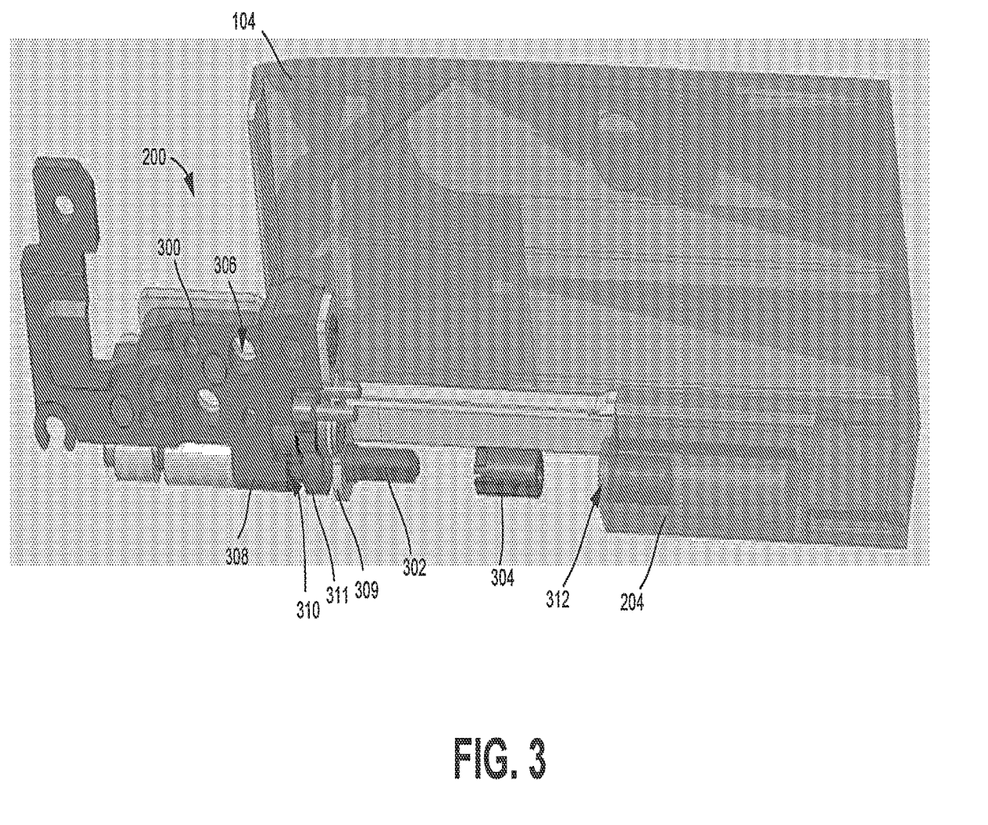
FIG. 3 is an enlarged view of an example hinge cap on the example lid of the example laptop of FIG. 1 and a partially exploded view of one of the example hinges of FIG. 2.

FIG. 3 shows the first hinge 200 and a portion of the lid 104 including the first hinge cap 204. The first hinge 200 is shown in a partially exploded state. The first hinge cap 204 is shown as transparent to expose an internal bore, as disclosed in further detail herein.

In the illustrated example, the first hinge 200 includes a bracket 300, a shaft 302, and a sleeve 304. The bracket 300 is capable of being coupled to the base 102 (FIGS. 1 and 2) (the first portion) of the laptop computer 100. In particular, when the first hinge 200 is assembled with the laptop computer 100, the bracket 300 is coupled to the base 102). For example, in the illustrated example, the bracket 300 includes a plurality of openings 306 (one of which is referenced in FIG. 3). The openings 306 receive fasteners (e.g., bolts, screws) to couple the bracket 300 to the base 102. In other examples, the bracket 300 can be coupled to the base 102 via other chemical and/or mechanical fastening techniques. In some examples, the bracket 300 is formed by two or more bracket portions that are coupled together.

In the illustrated example of FIG. 3, the shaft 302 is rotatably coupled to the bracket 300. The bracket 300 has a barrel 308, sometimes referred to as a knuckle, loop, or node. The barrel 308 is formed by a curved portion of the bracket 300. The barrel 308 defines an opening 310. In some examples, the bracket 308 has multiple barrels that form or define the opening 310. The shaft 302 is disposed in the opening 310 of the barrel 308. In particular, a portion of the shaft 302 is disposed in the opening 310, and another portion of the shaft 302 extends outward from the opening 310. The shaft 302 is rotatable in the opening 310. In the illustrated example, the first hinge 200 includes an end plate 309 coupled (e.g., via one or more threaded fasteners) to the bracket 300. In the illustrated example, the shaft 302 has an enlarged portion 311, which is disposed between the bracket 300 and the end plate 309. This prevents the shaft 302 from being removed from the barrel 308.

In the illustrated example of FIG. 3, the first hinge cap 204 defines a bore 312 (e.g., an opening, a tunnel). The sleeve 304 is capable of being inserted into the bore 312. In particular, when the first hinge 200 is assembled, the sleeve 304 is disposed in the bore 312 of the first hinge cap 204 on the lid 104. The sleeve 304 has an opening, shown in further detail herein, to receive a portion of the shaft 302 when the first hinge 200 is assembled. Therefore, the sleeve 304 forms the interface between the shaft 302 and the first hinge cap 204 of the lid 104. When the first hinge 200 is assembled, the sleeve 304 is non-rotatably disposed in the first hinge cap 204, and the shaft 302 is non-rotatably disposed in the sleeve 304. However, the shaft 302 is rotatable relative to the bracket 300 (which is coupled to the base 102). This enables the lid 104 to rotate relative to the base 102.

Figure 4:
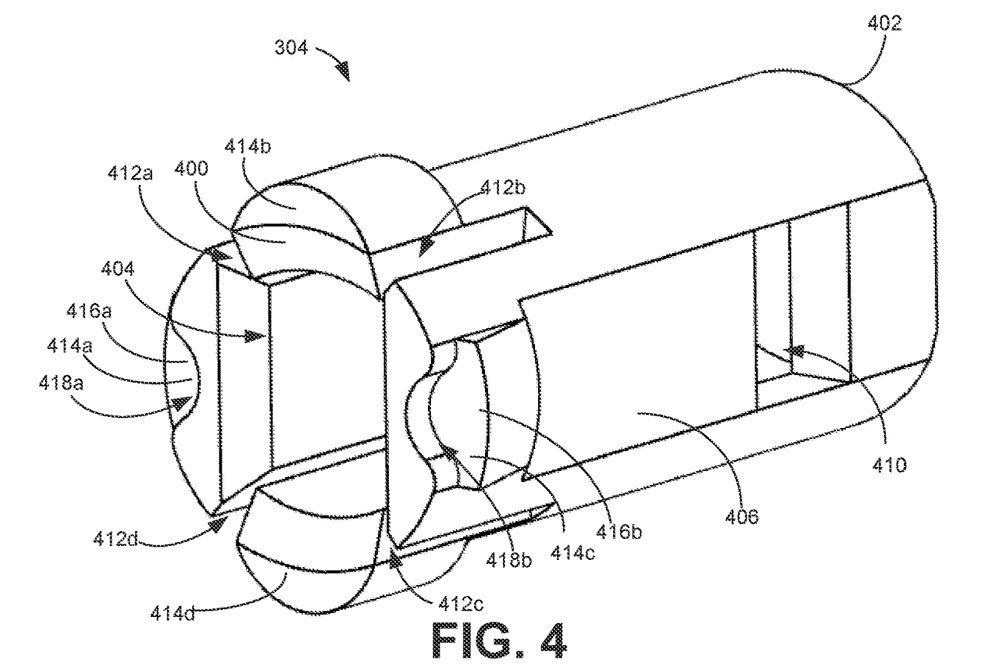
FIG. 4 is a perspective view of an example sleeve of the example hinge of FIG. 3.
Figure 5:
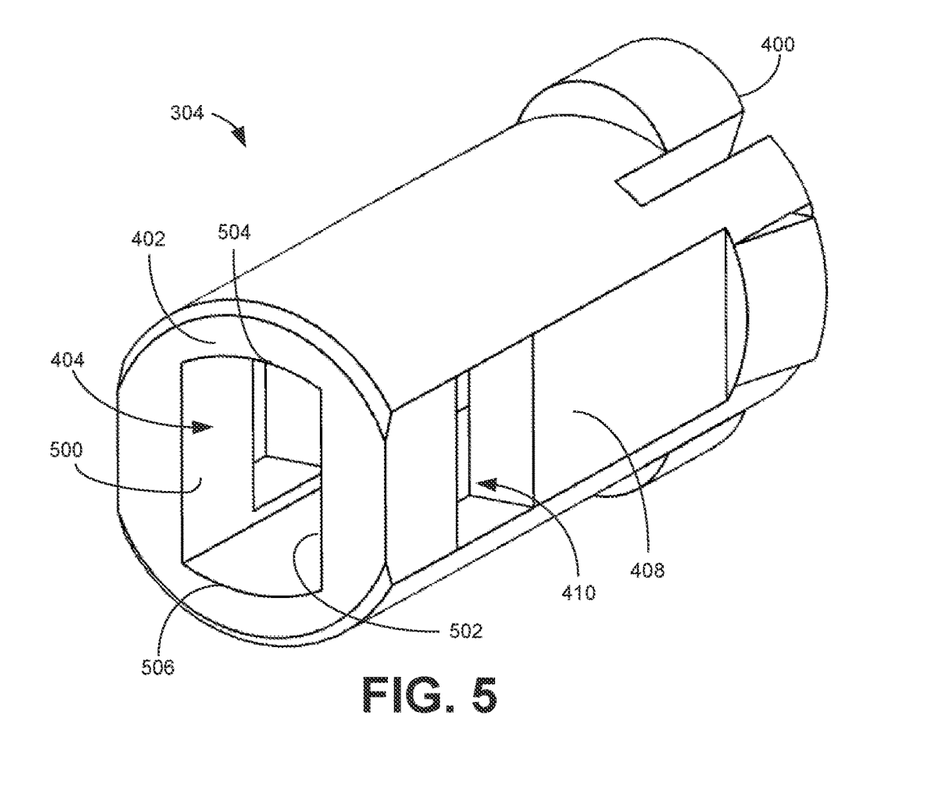
FIG. 5 is another perspective view of the example sleeve of FIG. 4.

FIGS. 4 and 5 are perspective views of opposite sides of the sleeve 304. As shown in FIGS. 4 and 5, the sleeve 304 has a first end 400 and a second end 400 opposite the first end 400. The sleeve defines an opening 404. When the first hinge 200 (FIG. 3) is assembled, a portion of the shaft 302 (FIG. 3) is inserted into the opening 404. In this example, the opening 404 extends through the sleeve 304 between the first end 400 and the second end 402. In other examples, the opening 404 may extend only partially into the first end 400.

In the illustrated example, the opening 404 has a stadium-shaped cross-section (sometimes referred to as a rounded-rectangular shape). In particular, as shown in FIG. 5, an inner surface of the sleeve 304 defining the opening 404 has two flattened inner side surfaces 500, 502 and two rounded side surface 504, 506. The shaft 302 (FIG. 3) has a cross-sectional shape that matches the cross-sectional shape of the opening 404. The flattened inner side surfaces 500, 502 of the opening 404 help center the shaft 302 in the sleeve 304 and prevent or limit the shaft 302 from rotating in the sleeve 304.

In the illustrated example of FIGS. 4 and 5, the sleeve 304 is substantially cylindrical-shaped. However, the sleeve 304 has opposing flattened outer side surfaces 406, 408. The inner surface of the bore 312 (FIG. 3) has matching flattened surfaces. When the sleeve 304 is disposed in the bore 312, the flattened side surfaces 406, 408 are disposed along and/or engaged with the corresponding surfaces in the bore 312. This helps guide and center the sleeve 304 when the sleeve 304 is inserted into the bore 312. The flattened outer side surfaces 406, 408 also prevent or limit the sleeve 304 from rotating in the bore 312 when the sleeve 304 is disposed in the bore 312. In the illustrated example, the sleeve 304 has an opening 410 extending between the flattened outer side surfaces 406, 408. The opening 410 extends through the sleeve 304 in a direction that is transverse to the opening 404. The opening 410 is used to receive hooks on a tool for removing the sleeve 304 from the bore 312, as disclosed in further detail herein.

As shown in FIG. 4, the sleeve 304 has four slots 412a-412d extending into the first end 400. Four flexible or elastic arms 414a-414d are defined between the slots 412a-412d. As such, the sleeve 304 has flexible arms 414a-414d on the first end 400. The arms 414a-414d can flex radially inward or outward, which is useful when installing or removing the sleeve 304 into/from the bore 312 (FIG. 3) of the first hinge cap 204 (FIG. 3). In this example, the sleeve 304 has four arms 414a, 414d. However, in other examples, the sleeve 304 can include more or fewer arms.

In the illustrated example, the first and third arms 414a, 414c have first and second tabs 416a, 416b, respectively, extending radially outward. The tabs 416a, 416b are used to lock the sleeve 304 in the bore 312, as disclosed in further detail herein. Further, as shown in FIG. 4, the first and third arms 414a, 414c have notches 418a, 418b (e.g., grooves, recesses), which are used to receive a tool for removing the sleeve 304 from the bore 312, as disclosed in further detail herein.

Figure 6:
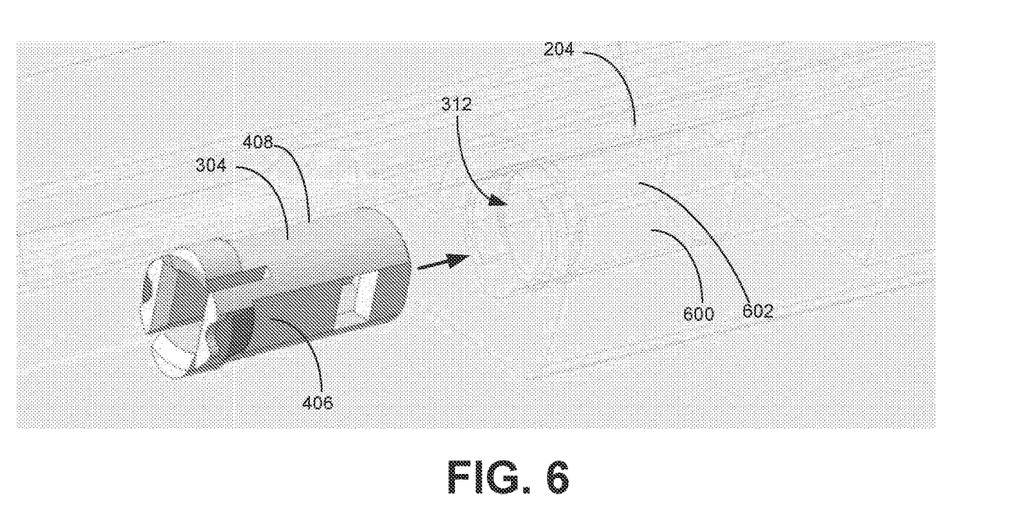
FIG. 6 shows the example sleeve of FIGS. 4 and 5 and the example hinge cap of FIG. 3. The example hinge cap is shown as transparent.

FIG. 6 shows the sleeve 304 aligned with the bore 312 in the first hinge cap 204 before being inserted into the bore 312. The first hinge cap 204 is shown as transparent. As shown in FIG. 6, the inside of the bore 312 has first and second flattened inner side surfaces 600, 602. The sleeve 304 is to be inserted into the bore 312 in one of two orientations such that the flattened outer side surfaces 406, 408 of the sleeve 304 are aligned with the flattened inner side surfaces 600, 602 of the bore 312.

Figure 7:
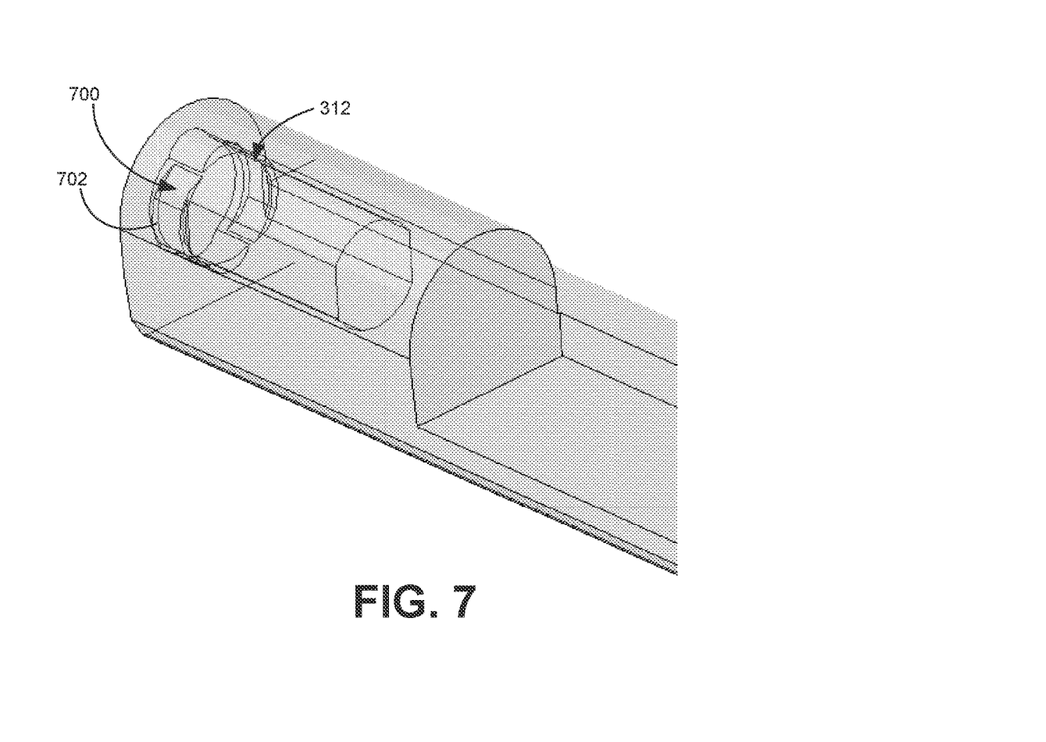
FIG. 7 is another view of the example hinge cap of FIG. 3 shown as transparent.
Figure 8:
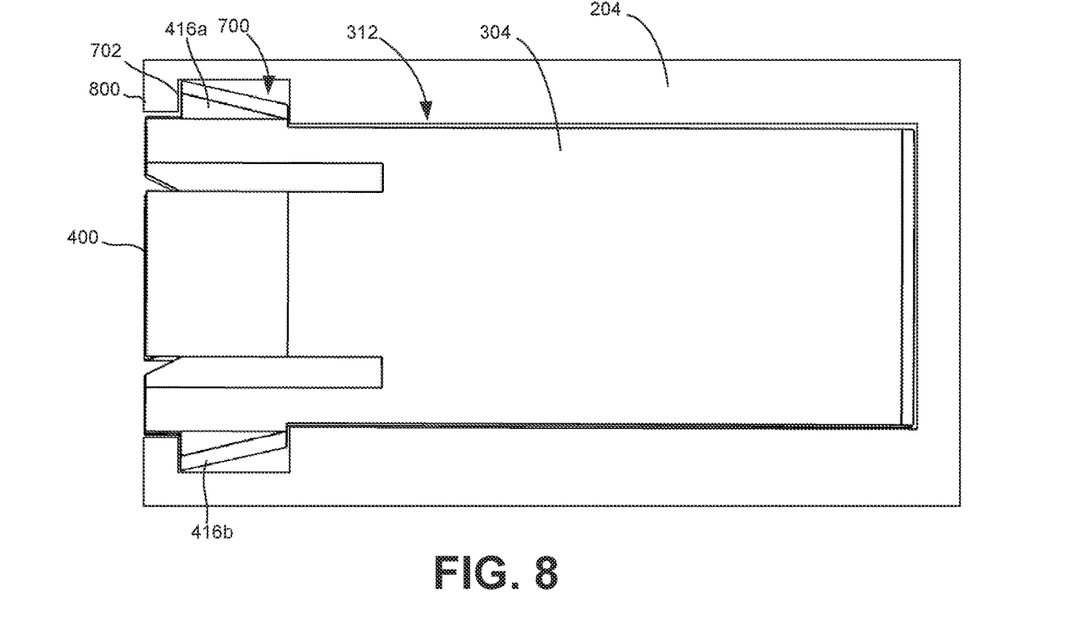
FIG. 8 is a side view showing the example sleeve of FIGS. 4 and 5 inserted into the example hinge cap of FIGS. 6 and 7.

As shown in FIG. 7, the bore 312 has an enlarged section 700 that forms a shoulder 702. The shoulder 702 has a smaller diameter than the tabs 416a, 416b on the sleeve 304. When the sleeve 304 is inserted into the bore 312, the first and third arms 414a, 414c are flexed inward until the tabs 416a, 416b clear the shoulder 702, and then the first and third arms 414a, 414c flex outward such that the tabs 416a, 416b are disposed beyond the shoulder 702. For example, FIG. 8 is a side view showing the first and second tabs 416, 416b in the enlarged portion 700. The first and second tabs 416a, 416b are engaged and/or otherwise blocked by the shoulder 702. This prevents the sleeve 304 from being removed from the bore 312. Further, the flattened inner side surfaces 600, 602 (FIG. 6) of the bore 312 and the flattened outer side surfaces 406, 408 (FIGS. 4 and 5) of the sleeve 304 non-rotatably couple the sleeve 304 in the bore 312.

In some examples, the sleeve 304 and the bore 312 are dimensioned to form a transition fit (sometimes referred to as a slip fix or push fit) between the sleeve 304 and the first hinge cap 204. This enables the sleeve 304 to be easily inserted and/or removed into/from the bore 312 without damaging the sleeve 304 or the first hinge cap 204. In some examples, the tolerance for the sleeve 304 and the bore 312 is ±0.05 millimeters (mm). In other examples, other tolerance can be used. In other examples, the sleeve 304 and the bore 312 can be dimensioned to form a clearance fit or interference fit. In some examples, when the sleeve 304 is inserted into the bore 312, the first end 400 of the sleeve 304 is aligned with an end surface 800 of the first hinge cap 204. In other examples, the first end 400 may protrude outward from or be recessed relative to the end surface 800 of the first hinge cap 204.

Figure 9:
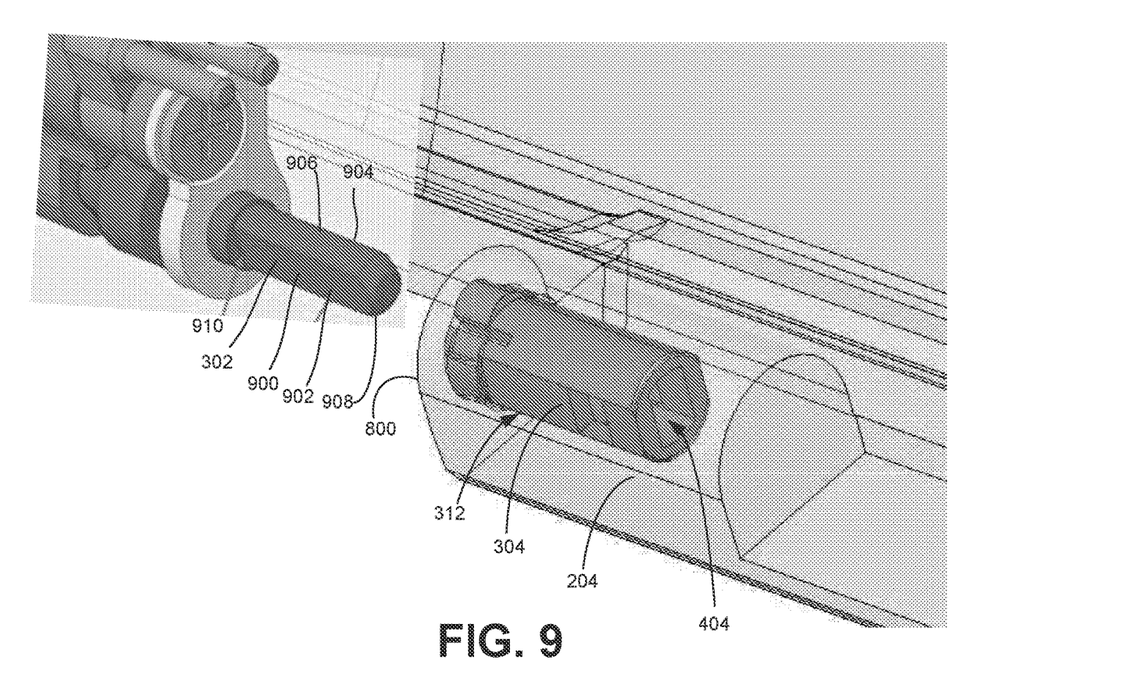
FIG. 9 shows the example sleeve of FIGS. 4 and 5 in the example hinge cap and an example shaft of the example hinge aligned with the example sleeve.

FIG. 9 shows the sleeve 304 in the bore 312 of the first hinge cap 204 and the shaft 302 aligned with the sleeve 304 before insertion. The shaft 302 has a portion 900 to be inserted into the opening 404 in the sleeve 304. The portion 900 of the shaft 302 has the same cross-sectional shape (e.g., a stadium shape) as the opening 404 in the sleeve 304. In particular, the portion 900 of the shaft has two flattened outer side surfaces 902, 904 and two curved outer side surfaces 906, 908. When the shaft 302 is inserted into the opening 404 of the sleeve, the flattened outer side surfaces 902, 904 are disposed along and/or engaged with the two flattened inner side surfaces 500, 502 (FIG. 5) of the opening 404. As such, when the shaft 302 is inserted into the sleeve 304, the shaft 302 does not rotate relative to the sleeve 304. This non-rotatably couples the shaft 302 and the sleeve 304. While in this example the opening 404 and the shaft 302 have a cross-sectional shape with two flattened side surfaces, in other examples, the opening 404 and the shaft 302 can have more or fewer flattened side surfaces and/or other cross-sectional shapes. In some examples, the shaft 302 and the opening 404 are dimensioned to form a transition fit between the shaft 302 and the sleeve 304. This enables the shaft 302 to be easily inserted and/or removed into/from the opening 404 without damaging the shaft 302 or the sleeve 304. In other examples, the shaft 302 and the opening 404 can dimensioned to form a clearance fit or interference fit.

In the illustrated example, the shaft 302 has an enlarged portion forming a shoulder 910 (e.g., a stop plane). In some examples, when the portion 900 of the shaft 302 is inserted into the opening 404 of the sleeve 304, the shoulder 910 engages the end surface 800 of the first hinge cap 204.

Figure 10:
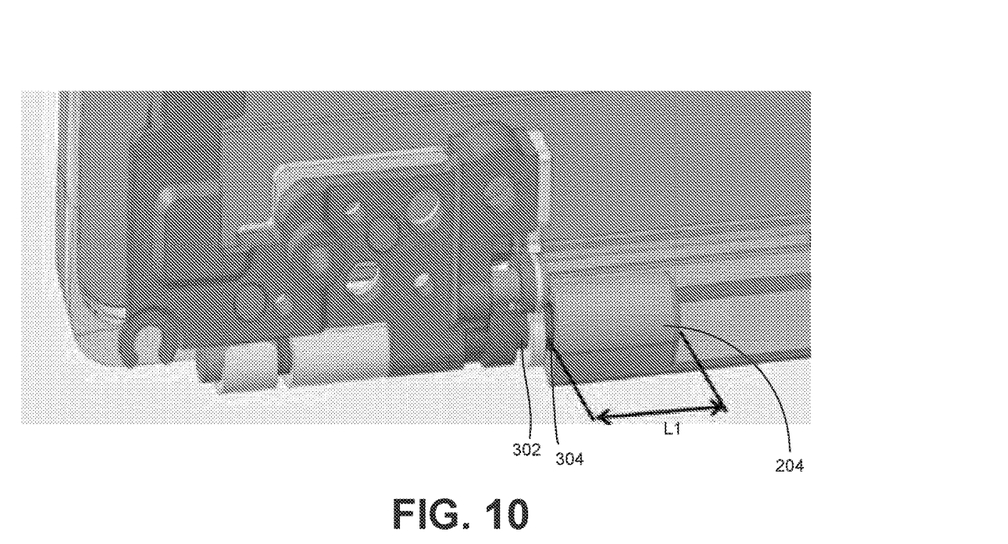
FIG. 10 shows the example shaft of FIG. 9 inserted into the example sleeve.

FIG. 10 shows the shaft 302 inserted into the sleeve 304. The use of the sleeve 304 with the flattened surfaces (inner and outer) forms a relatively strong, rigid interface between the shaft 302 and the first hinge cap 204. This reduces stress on the shaft 302, which enables the first hinge cap 204 to be shortened while still providing sufficient structural rigidity and support. As shown in FIG. 10, the first hinge cap 204 has a length of L1. In some examples, L1 is about 10 millimeters (mm) (e.g., +0.5 mm) or less. Known laptop computers have hinge caps of 20 mm or larger. Therefore, the first hinge cap 204 can be significantly shorter than known hinge caps. This is beneficial because it allows more for vent air flow from the base 102. In other examples, the length L1 can be longer than 10 mm.

Figure 11:
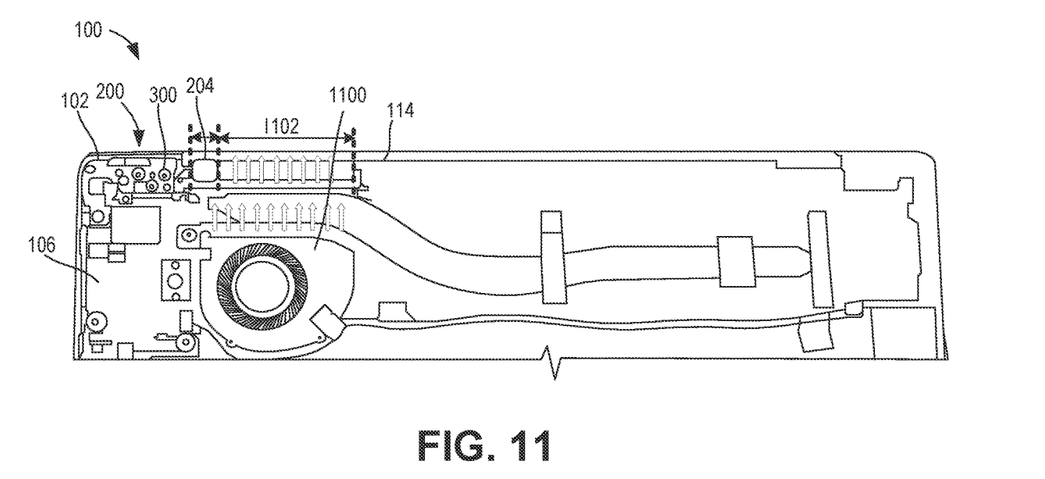
FIG. 11 is a top view of the example laptop computer of FIG. 1 showing an example fan in the example base and an example section of vent openings for the example fan.

FIG. 11 is a top view of laptop computer 100 with the top side 108 (FIG. 1) of the base 102 removed. The bracket 300 of the first hinge 200 is coupled to the base 102. The laptop computer 100 includes a fan 1100 (e.g., a blower) in the base 102 to exhaust hot/warm air from the base 102 to help cool the electrical components 106. The rear edge 114 of the base 102 has a section 1102 with one or more vent openings. The fan 1100 is positioned to blow the air through the vent opening(s). As disclosed above, the first hinge cap 204 is relatively short compared to known hinge caps. This enables more room for the vent opening(s) for the fan 1100. It is generally known that electronic components operate more efficiently in cooler temperatures. As such, the reduced length hinge cap improves (e.g., increases) the cooling capacity of the fan 1100 and thereby improves efficiency of the laptop computer 100.

As disclosed above, in some examples, the first hinge 200 can be disconnected from the base 102 and the lid 104 for repair and/or replacement. The first hinge 200 can be disconnected from the base 102 and the lid 104 without damage to the base 102 or the lid 104. This reduces costs associated with repair or replacement of the first hinge 200.

Figure 12:
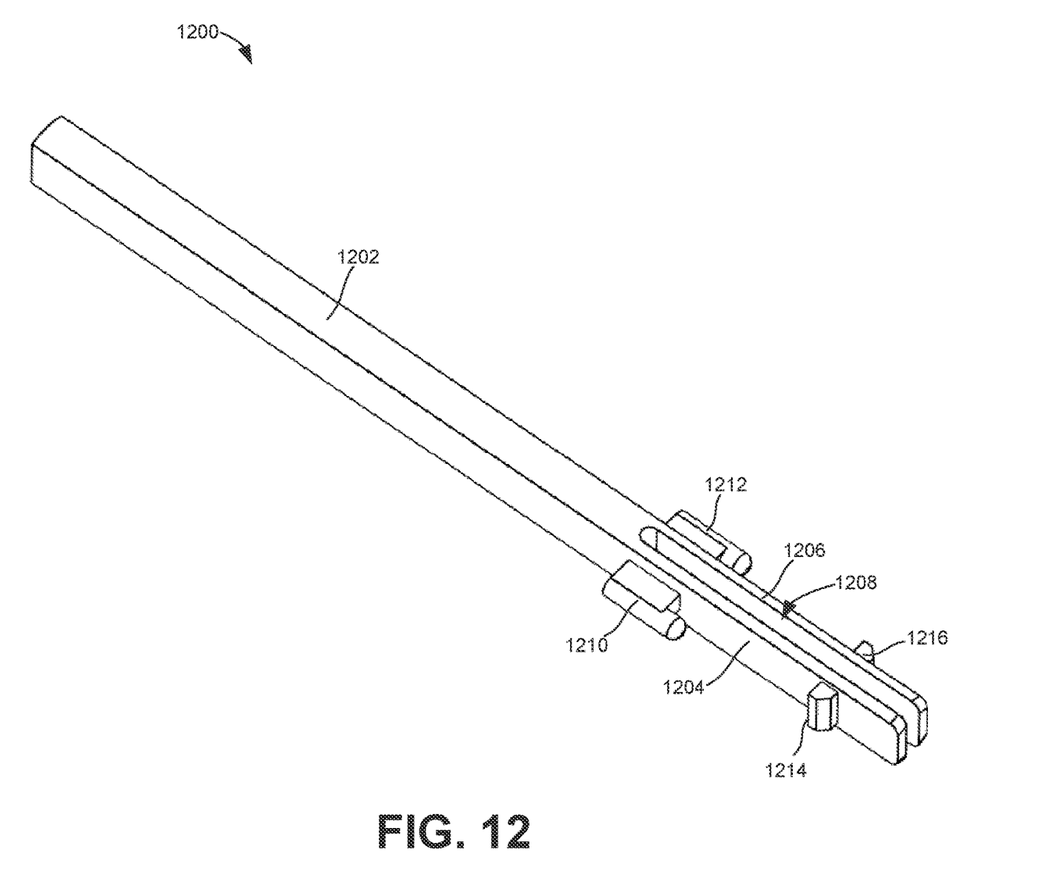
FIG. 12 is a perspective view of an example tool that can be used to remove the example sleeve of FIGS. 4 and 5 from the example hinge cap of FIGS. 6 and 7.

FIG. 12 is a perspective view of an example tool 1200 constructed in accordance with the teachings of this disclosure. The example tool 1200 can be used to remove the sleeve 304 from the bore 312 of the first hinge cap 204. This enables the sleeve 304 to be easily repaired or replaced if the sleeve 304 fails. In some examples, the example tool 1200 can be included as part of a kit or assembly that is manufactured and sold with one or more of the hinges. In some examples, the tool 1200 is provided as part of the laptop computer 100. In other examples, the tool 1200 is provided (e.g., sold) separately from the hinges 200, 202 and/or the laptop computer 100.

In the illustrated example, the tool 304 has a handle portion 1202 that can be held in the hand of a person. The tool 1200 also has first and second prongs 1204, 1206 (e.g., tines) extending from the handle portion 1202. The prongs 1204, 1206 are separated by a slot or cut-out 1208, which enables the first and second prongs 1204, 1206 to be flexed toward each other (e.g., pinched together). The tool 1200 has first and second pins 1210, 1212 on the outer sides of the first and second prongs 1204, 1206, respectively. The tool 1200 also has first and second hooks 1214, 1216 on the outer sides of the first and second prongs 1204, 1206, respectively. In some examples, the tool 1200 is constructed as a single unitary part or component (e.g., a monolithic structure). In some examples, the tool 1200 is constructed of plastic and/or metal. In other examples, the tool 1200 can be constructed as multiple parts or components that are coupled together.

Figure 13:
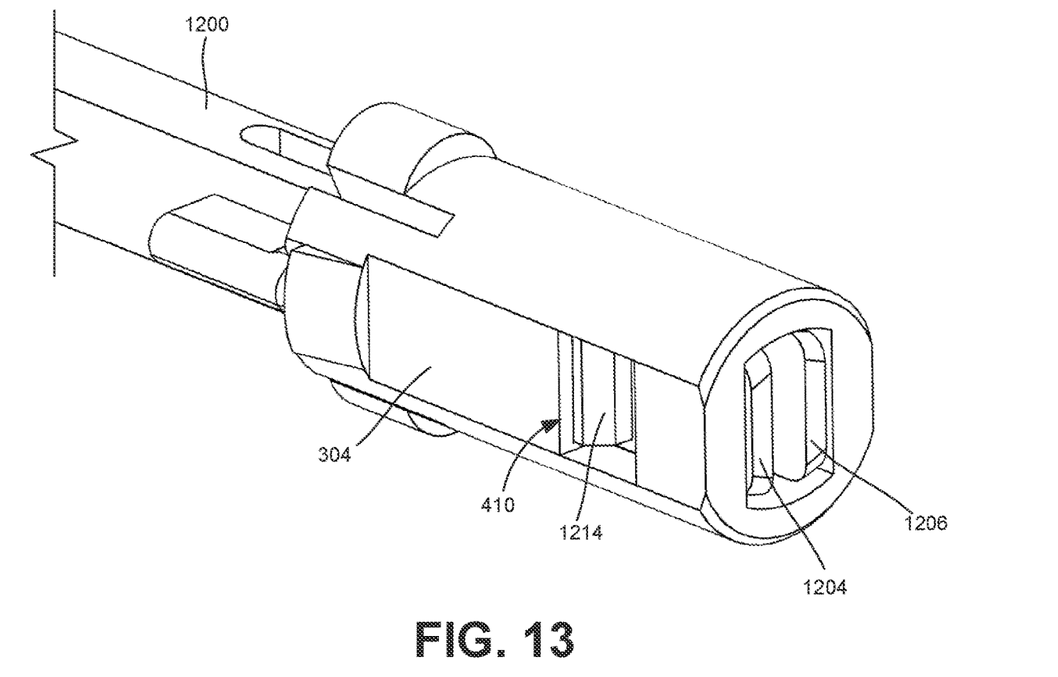
FIG. 13 is a perspective view showing the example tool of FIG. 12 inserted into the example sleeve of FIGS. 4 and 5.

To remove the sleeve 304 from the bore 312, a user can insert the prongs 1204, 1206 into the opening 404 of the sleeve 304. The hooks 1214, 1216 are tapered or angled, such that when the prongs 1204, 1206 are inserted into the opening 404, the hooks 1214, 1216 engage the sleeve 304 and flex the prongs 1204, 1206 together. FIG. 13 shows the prongs 1204, 1206 of the tool 1200 inserted into the opening 404 of the sleeve 304. When the hooks 1214, 1216 reach the opening 410, the prongs 1204, 1206 expand (e.g., move apart) such that such that the hooks 1214, 1216 are disposed in the opening 410. This attaches the sleeve 304 to the tool 1200 so that the tool 1200 can pull the sleeve 304 from the bore 312.

Figure 14:
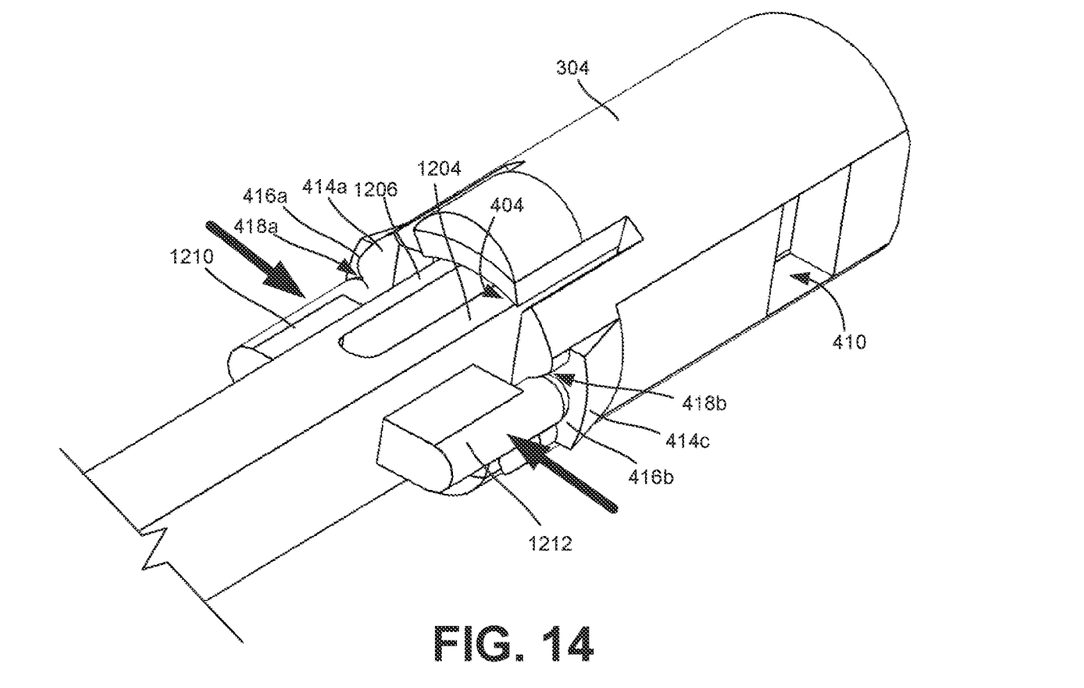
FIG. 14 is another perspective view show the example tool inserted into the example sleeve of FIGS. 4 and 5.

As shown in FIG. 14, when the prongs 1204, 1206 are inserted into the opening 404 for the sleeve 304, the pins 1210, 1212 slide into the notches 418a, 418b in the first and third arms 414a, 414c of the sleeve 304. Then, a user can pinch the prongs 1204, 1206 together (as shown by the arrows), which causes the pins 1210, 1212 to move the first and third arms 414a, 414c radially inward so that that the tabs 416a, 416b clear the shoulder 702 (FIG. 7). When the tabs 416a, 416b are clear of the shoulder 702, the user can pull the tool 1200 outward, which slides the sleeve 304 outward from the bore 312 of the first hinge cap 204. When the user pinches the prongs 1204, 1206 together, the hooks 1214, 1216 (FIGS. 12 and 13) remain in the opening 410, which enables the tool 1200 to pull the sleeve 304 outward from the bore 312 of the first hinge cap 204.

Figure 15:
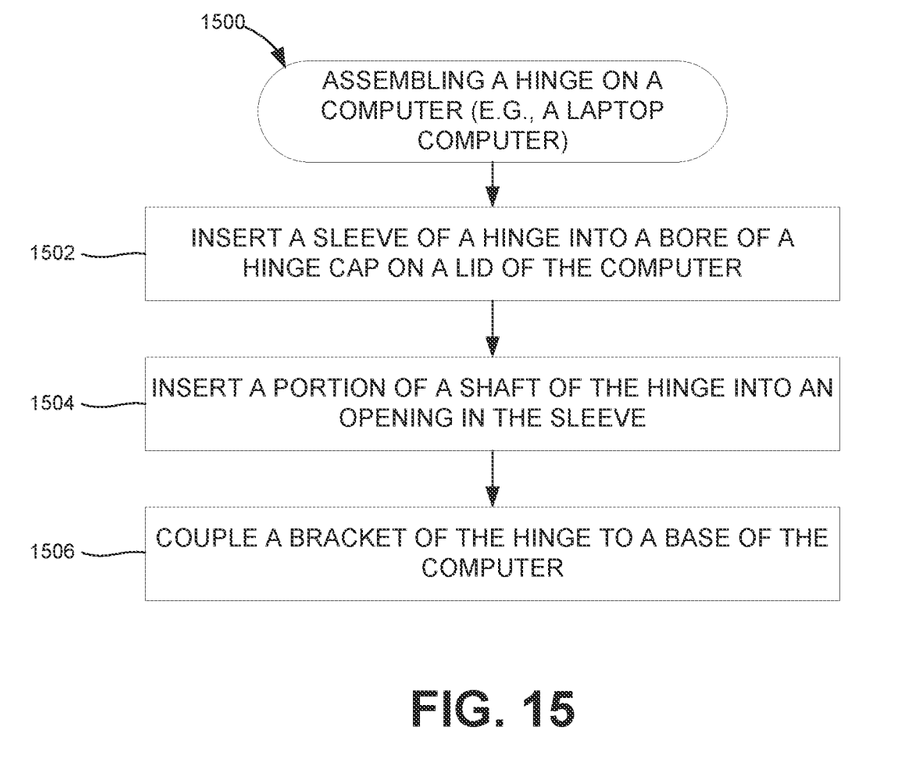
FIG. 15 is a flowchart representative of an example method of assembling an example hinge on an example laptop computer.

FIG. 15 is a flowchart representative of an example method 1500 of assembling or installing the first hinge 200 on the laptop computer 100. The example method 1500 is described in connection with the first hinge 200. The example method 1500 can be similarly performed in connection with the second hinge 202. In the example method 1500, it is assumed the shaft 302 of the first hinge 200 is already rotatably coupled to the bracket 300.

The example method 1500 includes inserting the sleeve 304 of the first hinge 200 into the bore 312 of the first hinge cap 204 (block 1502). In some examples, the sleeve 304 is inserted until the first and second tabs 416a, 416b clear the shoulder 702, which locks the sleeve 304 in the bore 312. In some examples, the sleeve 304 is inserted by a user (e.g., a person). In other examples, the sleeve 304 is inserted by a machine or tool. In some examples, the sleeve 304 and the bore 312 are dimensioned to form a transition fit between the sleeve 304 and the first hinge cap 204. As such, the sleeve 304 can be easily slid into the bore 312.

The method 1500 includes inserting the portion 900 of the shaft 302 into the opening 404 in the sleeve 304 (block 1504). In some examples, the shaft 302 is inserted by a user (e.g., a person). In other examples, the shaft 302 is inserted by a machine or tool. In some examples, the shaft 302 and the opening 404 are dimensioned to form a transition fit between the shaft 302 and the sleeve 304. As such, the shaft 302 can be easily slid into the opening 404 of the sleeve 304.

The method 1500 includes coupling the bracket 300 of the first hinge 200 to the base 102 of the laptop computer 100 (block 1506). For example, one or more threaded fasteners can be inserted through the openings 306 and screwed into the base 102. In some examples, the shaft 302 is inserted into the sleeve 304 first, and then the bracket 300 is coupled to the base 102. In other examples, the bracket 300 can be coupled to the base first, and then the shaft 302 is inserted into the sleeve 304. In other examples, the shaft 302 is inserted into the sleeve 304 first, and then the sleeve 304 with the shaft 302 are inserted into the bore 312 of the first hinge cap 204.

To remove or disassemble the first hinge 200, the example method 1500 can be performed in reverse. For example, the bracket 300 can be disconnected (e.g., unscrewed) from the base 102. Then, the shaft 302 can be slid out of the sleeve 304. Then, the sleeve 304 can be removed from the first hinge cap 204. In some examples, to remove the sleeve 304 from the bore 312 of the first hinge cap 204, the tool 1200 can be used, as disclosed in connection with FIGS. 12-14.

While in some examples disclosed herein the bracket 300 is coupled to the base 102 and the shaft 302 is connected to the lid 104, in other examples, the hinge connections can be reversed. For example, in some examples, the bracket 300 can be coupled (e.g., screwed) to the lid 104, and the shaft 302 and the sleeve 304 can be inserted into a hinge cap on the base 102. The hinge connections can be varied based on the type of electronic device.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example laptop computer hinges have been disclosed that enable shorter hinge caps on the lid of the laptop computer. Shorter hinge caps allow more room for the fan outlet opening(s), which improves the cooling capability of the system and reduces temperatures in the laptop computer. The example hinges disclosed herein are also removable and replaceable without damage to the laptop computer. This reduces costs associated with repairing and/or replacing parts of the laptop computer.

Examples and combinations of examples disclosed herein include the following:

Example 1 is a hinge for an electronic device. The hinge comprises a bracket capable of being coupled to a first portion of the electrical device. The bracket has a barrel defining a first opening. The hinge also comprises a shaft in the first opening. The shaft is rotatable in the first opening. The hinge further comprises a sleeve capable of being inserted into a bore in a second portion of the electronic device, the sleeve defining a second opening to receive a portion of the shaft.

Example 2 includes the hinge of Example 1, wherein an inner surface of the sleeve has flattened inner side surfaces, and wherein the portion of the shaft has flattened outer side surfaces.

Example 3 includes the hinge of Examples 1 or 2, wherein the sleeve has opposing flattened outer side surfaces.

Example 4 includes the hinge of any of Examples 1-3, wherein the sleeve has a first end and a second end opposite the first end, the second opening extending through the sleeve between the first end and the second end.

Example 5 includes the hinge of Example 4, wherein the sleeve has flexible arms on the first end.

Example 6 includes the hinge of Example 5, wherein two of the flexible arms have tabs to engage a shoulder in the bore of the second portion of the laptop computer.

Example 7 includes the hinge of any of Examples 4-6, wherein the sleeve has a third opening extending in a direction that is transverse to the second opening.

Example 8 includes the hinge of any of Examples 1-7, further including an end plate coupled to the bracket, the shaft having an enlarged portion between the bracket and the end plate.

Example 9 includes the hinge of any of Examples 1-8, wherein the shaft and the second opening of the sleeve are dimensioned to form a transition fit between the shaft and the sleeve.

Example 10 includes the hinge of any of Examples 1-9, wherein the bracket has an opening to receive a threaded fastener to couple the bracket to the second portion of the laptop computer.

Example 11 is a computer comprising a base, a lid, the lid having a hinge cap defining a bore, and a hinge rotatably coupling the base and the lid. The hinge includes a sleeve in the bore of the hinge cap, the sleeve defining an opening, a bracket coupled to the base, and a shaft rotatably coupled to the bracket, the shaft extending into the opening in the sleeve.

Example 12 includes the computer of Example 11, wherein the bore has an enlarged section forming a shoulder, the sleeve having a tab engaged with the shoulder to prevent the sleeve from being removed from the bore.

Example 13 includes the computer of Examples 11 or 12, wherein the bore has flattened inner side surfaces and the sleeve has flattened outer side surfaces to non-rotatably couple the sleeve in the bore.

Example 14 includes the computer of any of Examples 11-13, wherein the opening in the sleeve has a stadium-shaped cross-section.

Example 15 includes the computer of Example 14, wherein the shaft has a cross-sectional shape that matches the opening in the sleeve.

Example 16 includes the computer of any of Examples 11-15, wherein the hinge cap has a length of about 10 millimeters or less.

Example 17 includes the computer of any of Examples 11-16, further including a keyboard carried by the base and a display carried by the lid.

Example 18 is a method comprising inserting a sleeve of a hinge into a bore in a hinge cap on a lid of a computer. The hinge includes a bracket and a shaft rotatably coupled to the bracket. The method further comprises inserting the shaft into the sleeve and coupling the bracket to a base of the computer.

Example 19 includes the method of Example 18, wherein the sleeve and the bore of the hinge cap are dimensioned to form a transition fit between the sleeve and the hinge cap.

Example 20 includes the method of Examples 18 or 19, wherein the shaft and an opening in the sleeve are dimensioned to form a transition fit between the shaft and the sleeve.

Example 21 is an assembly comprising a hinge for a computer. The hinge includes a sleeve to be inserted into a bore of a hinge cap on the computer. The sleeve has an opening to receive a hinge shaft. The assembly also comprises a tool to remove the sleeve from the bore of the hinge cap. The tool includes a handle portion, first and second prongs extending from the handle portion, first and second pins on the first and second prongs, and first and second hooks on the first and second prongs.

Example 22 includes the assembly of Example 21, wherein the opening is a first opening, the sleeve defining a second opening, wherein, when the first and second prongs of the tool are inserted into the first opening of the sleeve, the first and second hooks extend into the second opening of the sleeve.

Example 23 includes the assembly of Examples 21 or 22, wherein the sleeve has first and second arms with first and second notches, wherein, when the first and second prongs of the tool are inserted into the opening of the sleeve, the first and second pins extend into the first and second notches.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A hinge for an electronic device, the hinge comprising:
a bracket capable of being coupled to a first portion of the electronic device, the bracket having a barrel defining a first opening;
a shaft in the first opening, the shaft rotatable in the first opening; and
a sleeve capable of being inserted into a bore in a second portion of the electronic device, the sleeve defining a second opening to receive a portion of the shaft, the sleeve having a first end and a second end opposite the first end, the sleeve having flexible arms on the first end, at least two of the flexible arms having tabs to engage a shoulder in the bore of the second portion of the electronic device.

2. The hinge of claim 1, wherein an inner surface of the sleeve has flattened inner side surfaces, and wherein the portion of the shaft has flattened outer side surfaces.

3. The hinge of claim 1, wherein the sleeve has opposing flattened outer side surfaces.

4. The hinge of claim 1, wherein the second opening extends through the sleeve between the first end and the second end.

5. The hinge of claim 4, wherein the sleeve has a third opening extending in a direction that is transverse to the second opening.

6. The hinge of claim 1, including an end plate coupled to the bracket, the shaft having an enlarged portion between the bracket and the end plate.

7. The hinge of claim 1, wherein the shaft and the second opening of the sleeve are dimensioned to form a transition fit between the shaft and the sleeve.

8. The hinge of claim 1, wherein the bracket has an opening to receive a threaded fastener to couple the bracket to the second portion of the electronic device.

9. A computer comprising:
a base;
a lid, the lid having a hinge cap defining a bore, the bore having a shoulder at an enlarged section; and
a hinge rotatably coupling the base and the lid, the hinge including:
a sleeve in the bore of the hinge cap, the sleeve defining an opening, the sleeve having a first end and a second end opposite the first end, the sleeve having slots extending into the first end such that flexible arms are defined between the slots, a first one of the flexible arms having a tab engaged with the shoulder to prevent the sleeve from being removed from the bore;
a bracket coupled to the base; and
a shaft rotatably coupled to the bracket, the shaft extending into the opening in the sleeve.

10. The computer of claim 9, wherein the bore has flattened inner side surfaces and the sleeve has flattened outer side surfaces to non-rotatably couple the sleeve in the bore.

11. The computer of claim 9, wherein the opening in the sleeve has a rounded-rectangular cross-section.

12. The computer of claim 11, wherein the shaft has a cross-sectional shape that matches the opening in the sleeve.

13. The computer of claim 9, wherein the hinge cap has a length of about 10 millimeters or less.

14. The computer of claim 9, including a keyboard carried by the base and a display carried by the lid.

15. A method comprising:
inserting a sleeve of a hinge into a bore in a hinge cap on a lid of a computer, the hinge including a bracket and a shaft rotatably coupled to the bracket, the bore having a shoulder, the sleeve having a first end and a second end opposite the first end, the first end having flexible arms, at least two of the flexible arms having respective tabs, the tabs having an outer diameter that is larger than an inner diameter of the shoulder, such that when the sleeve is inserted into the bore and the tabs clear the shoulder, the tabs prevent the sleeve from being removed from the bore;
inserting the shaft into the sleeve; and
coupling the bracket to a base of the computer.

16. The method of claim 15, wherein the sleeve and the bore of the hinge cap are dimensioned to form a transition fit between the sleeve and the hinge cap.

17. The method of claim 15, wherein the shaft and an opening in the sleeve are dimensioned to form a transition fit between the shaft and the sleeve.

* * * * *